(12) United States Patent
Welker

(10) Patent No.: US 9,075,231 B2
(45) Date of Patent: Jul. 7, 2015

(54) CARRIER DEVICE FOR AN ELECTRONIC DISPLAY UNIT

(71) Applicant: Stefan Welker, Bonn (DE)

(72) Inventor: Stefan Welker, Bonn (DE)

( * ) Notice: Subject to any disclaimer, the term of this patent is extended or adjusted under 35 U.S.C. 154(b) by 0 days.

(21) Appl. No.: 14/062,955

(22) Filed: Oct. 25, 2013

(65) Prior Publication Data

US 2014/0362445 A1 Dec. 11, 2014

(30) Foreign Application Priority Data

Jun. 7, 2013 (DE) ..................... 20 2013 102 458 U

(51) Int. Cl.
*G02B 27/14* (2006.01)
*G02B 27/01* (2006.01)

(52) U.S. Cl.
CPC .......... *G02B 27/0172* (2013.01); *G02B 27/017* (2013.01); *G02B 2027/0127* (2013.01); *G02B 2027/0138* (2013.01)

(58) Field of Classification Search
USPC ................................................. 359/630–639
See application file for complete search history.

(56) References Cited

U.S. PATENT DOCUMENTS 6,144,347 A * 11/2000 Mizoguchi et al. ............... 345/8
6,384,982 B1 * 5/2002 Spitzer .......................... 359/630

* cited by examiner

*Primary Examiner* — Mohammed Hasan
(74) *Attorney, Agent, or Firm* — Patricia M. Mathers

(57) ABSTRACT

A carrier device for an electronic display unit, having a frame with a front face and a rear face, whereby the front face has a seating surface for placing against the forehead of a user and the rear face has a surface designated a device mount, against which the electronic display unit is placed. The electronic display unit is a device separate from the carrier device. At least one optical converging lens is placed between the front and rear faces of the frame. The carrier device is constructed to be mounted or carried on the head of a user, thereby enabling hands-free viewing of the electronic display unit.

16 Claims, 3 Drawing Sheets

CARRIER DEVICE FOR AN ELECTRONIC DISPLAY UNIT

BACKGROUND INFORMATION

1. Field of the Invention

The invention relates to the field of head mounts for holding a device on the head of a user. More particularly, the invention relates to a hands-free head mount for an electronic display unit.

2. Discussion of the Prior Art

Conventional carrier devices are known. They serve, for example, to display electronic games, so that the user, without having to use a large monitor, can place a small monitor in the form of the electronic display unit before his or her eyes, in a manner similar to wearing a pair of glasses. In order to eliminate undesired effects, such as brightness and other external influences, the conventional carrier devices typically have a frame, which is formed as a tunnel or tube section. This frame has a curved surface area on the one end that is used to place the frame on the head of the user and has a bracket on the other end, that holds the electronic display unit. The electronic display unit has a screen that is approximately the size of a hand. An optical converging lens is placed between the front face of the frame that fits against the user's head and the rear face that has the holder or retainer for the device. This is done to reduce the length of the tube section, i.e., the length of the frame, to a manageable size. The user of the screen can then view the electronic display unit from a relatively short distance without difficulty, for example, at a distance of maximal fifteen cm, and particularly, at a distance of three to eight cm from the user's eye.

One of the difficulties of the conventional display unit is that the user has to use one or both hands to hold the display unit in a position for viewing. Even if only one hand is needed to hold the display unit in the viewing range, and the user has the other hand available for operating the controls, this presents a significant reduction in the ability of the user to use all control possibilities that would otherwise be available, if both hands were free. Game consoles are frequently constructed such, that both hands are used to operate the controls. Even with game controls for games played on a PC, whereby the controls are operated via the keyboard, control functions are applied to keys on the keyboard, such that the user uses both hands for the controls.

BRIEF SUMMARY OF THE INVENTION

An object of the invention is to improve the conventional carrier device such, that the user can control the unit without difficulty, thereby influencing the display of the images shown on the electronic display unit.

The display unit according to the invention is held in place on the user's head by means of a hands-free head mount, which holds the display unit in a viewing position in front of the user's eyes and leaves both hands free for operating the controls.

A person of skill in the art is familiar with various possibilities of fitting a carrier device to the head of the user, such as, with the use of bands, brackets, etc.

With the carrier device according to the invention, at least one available optical converging lens is mounted so as to be adjustable in the direction of the optical axis of the lens, so that the distance between the converging lens and the mount or holder for the display device is adjustable. In this way, the user is able to adjust the focus of the optical converging lens in the carrier device to his or her personal needs.

Advantageously, not just one, but two converging lenses are mounted so as to be adjustable in a direction transverse to the optical axes of the lenses, so that the distance between the two optical converging lenses may be adjusted. Thus, it is possible to allocate one optical converging lens to each eye of the user and to adjust the distance of the two lenses to the distance between the two eyes of the user. The adaptation to the specific needs of the user is optimized when not only the width distance of the converging lenses is adjustable, but when also the two separate optical converging lenses are adjustable in along their respective optical axis.

At least one sensor that senses the distance between the two converging lenses is provided in the carrier device according to the invention. This sensor may be mounted, for example, between the two converging lenses. Alternatively, two sensors may be provided, one on each converging lens or on the holder for each converging lens, so that the distance between the two converging lenses may be calculated based on a comparison of data from the two sensors. Such a sensor setup provides a particularly realistic and natural presentation of the images displayed on the electronic display unit, adaptable for each individual use.

Advantageously, the sensor for measuring the distance of the lenses may be constructed as a pipe, similar to the type of pipes that are known to the public as bird pipes and that have a movable head, for generating tones of different pitches, based on the position of the piston. The pipe has two basic components, the pipe body itself and a movable piston. In the carrier device according to the invention, such a sensor or pipe generates different pitches as a function of the distance of the converging lenses relative each other. To achieve this, each one of the two basic components is allocated to one of the converging lenses. Thus, for example, the pipe body is connected to one converging lens and the movable piston is connected to the other converging lens. Assuming that the electronic display unit is constructed not only as a simple screen, but, for example, also has a microphone, then the sensor signals that represent the distance of the converging lenses to each other are transmitted as pipe tones to the electronic display unit, simply by using the microphone of the electronic display unit for transmitting the signal. This eliminates the need for any electrical contact, such as a cable connection, etc.

If, as mentioned above, the position of each individual converging lens is to be recorded individually and then the distance of the converging lenses relative each other to be determined from the values of the recorded positions, it is advantageous to construct the sensors as pipes, as described above, in such a way, that one of the two basic components of the pipe is connected to the converging lens and the other to the frame of the carrier device.

It is possible to change the pitch of the by adjusting one of the two converging lenses transverse to its optical axis. The position of the two converging lenses is then derived from the pitches of the two sensors, so that then the distance between lenses may be determined.

The two optical converging lenses provided in the carrier device according to the invention are preferably adjustable not just together as one, but rather, are adjustable independently of each other. In this regard, it is a particular advantage that the adjustability of the converging lenses is twofold. First, each converging lens is independently adjustable in the direction of its optical axes, thereby allowing the user to adjust the focus of each individual lens to the specific needs of each eye of the user. Second, each converging lens is adjustable width wise, that is, the distance between the two converging lenses in a direction transverse to the direction of the optical axes of the converging lenses is adjustable, so as to accommodate the distance between eyes of the user. The fact that the two converging lenses are not geared or ganged with each other or otherwise connected to each other is a particular advantage for the individual user. Being ganged together would mean that the lenses could only be moved simultaneously and in concert to achieve a greater or lesser distance. With the carrier device according to the invention, it is possible to adapt each individual lens optimally to the visual needs of the user and to position them appropriately to both eyes of the user, completely independently of each other, thereby providing an optimal adjustment for the particular user.

Advantageously, one or both of the converging lenses may be adjusted by means of a motor. This is a particularly convenient way of adjusting the converging lens. Also, depending on the motor or the motor-gear unit, a worm gear may be used as a gear unit. The worm gear has a self-limiting effect and this may be used to advantage as a stop for the converging lens, which keeps the converging lens in the selected position, without requiring additional manipulations to keep the converging lens in its position.

As mentioned at the beginning, the carrier device according to the invention may be advantageously constructed such that the frame is constructed as a light tunnel or tube that constricts the incidence of light from the side and/or from above. For example, the frame may be constructed as a tube, whereby the tube does not have a completely closed circumference in cross-section, but rather, preferably, has a shape similar to a C-shape, with the C-opening facing toward the bottom, so that the frame leaves an open space to accommodate the nose of the user. This open space also serves as a ventilation opening to the inner space of the frame, to reliably avoid condensation on the electronic display unit or on the converging lenses.

With the frame of the carrier device constructed as a light tube, a guide element for the adjustability of the converging lenses may be accessible on the outside of the frame. The guide element is used to set the position of the converging lens. A button or switch may be used as an operating means for adjusting the converging lens via a motor. The guide element may, instead, be a handle that is movable, with some resistance, along the length dimension of the frame. In this case, the guide element extends through the frame into the inner space of the light tube, whereby the converging lens is affixed to this guide element in the inner space of the frame. The guide element extends through the frame to the outside, so it is easy to grasp, even while the user is wearing the carrier device. In this way, the user is able to change the adjustment of at least one converging lens, even while viewing images on the electronic display unit.

Advantageously, the device mount also allows a display surface that is oriented vertically, i.e., in a flat position and formed lengthwise, such as is known in so-called smart phones. A safety latch is provided on the frame of the carrier device. The safety latch extends up over the rear side of the electronic display unit, the rear side being the side that is opposite the side with the display. The safety latch covers several surface areas of the rear side of the electronic display unit, these areas covered by the safety latch being designated hereinafter as retainer surfaces.

As mentioned at the beginning, it is possible to construct the head mount as a cap or helmet, so that the head mount encircles the head of the user, in the manner of a hood. The head mount may be made of a rigid or a flexible material. A brim may also be provided that extends out over the forehead of the user, such as is typical with caps or helmets, and the device mount provided on the brim.

Alternatively, the head mount may be constructed as a head band that is a strip of material that horizontally encircles the user's head, similar to head bands that are used to mount head lamps or similar devices.

Advantageously the device mount may have a cross-section that is similar to the shape of an upright C, so that the electronic display unit is securely held by the device mount, whereby the C-shaped construction of the cross-section has a recess that is open toward the converging lens. This ensures an unobstructed view of the display.

Viewing apparatus according to the invention comprises the previously described carrier device and an electronic display unit that has an electronic display surface for viewing images. Advantageously, the electronic display unit may be constructed as a mobile phone or a so-called mobile player, that is, a device that corresponds essentially to a mobile phone, but does not have the functional unit to connect with a mobile communications network, but rather, is used to display images, videos, music. The conventional mobile phone or mobile player has, in many cases, a sufficiently large display surface to display images, and particularly, a display surface that is large enough to display two images next to each other, to provide stereoscopic viewing that enhances the impression of a three-dimensional image. Furthermore, such devices frequently have connectors or sensors that allow the device to be connected to a carrier device. For example, mobile phones are always are equipped with a microphone, and mobile players frequently are. This makes it possible to transmit data between the carrier device and the electronic display unit, similar to the manner described above in conjunction with the sound pipe.

It is a further advantage with the viewing apparatus according to the invention, when the electronic display unit also includes an inertial measurement unit (IMU). The IMU is a sensor arrangement that detects the spatial movement of the display unit. It is possible to control the electronic display unit with the help of the IMU, so that the contents of the screen that are displayed change automatically as a function of the movement of the user's head. In this way, the user is able to move within a virtual space that is displayed on the electronic display unit and, depending on the direction of view, the display presents a corresponding image content. In other words, the user is able to control the viewed image content, without having to use his or her hands or having to use the control elements that are provided on the device to control the direction of view on the electronic display unit.

In many cases, the electronic display unit is equipped with a camera, such as is known, for example, with mobile phones and mobile players. The device is typically longer than wide and the camera and/or the objective is typically found near one of the end faces of the particular device. The safety latch on the viewing apparatus that includes the electronic display unit and the carrier device according to the invention may be provided on the frame in a manner that leaves the camera objective exposed, i.e., uncovered. Camera images are used for certain applications, for example, when, in the sense of an augmented reality, contents of the camera images are to be displayed with other representations on the display of the electronic display unit. The safety latch provides a secure hold for the electronic display unit, without diminishing the ability to use the camera on the electronic display unit.

Advantageously, one or more diffuse light sources may be mounted on the carrier device, with which it is then possible to determine the absolute orientation, that is, the spatial orientation, in connection with the absolute position in the room, if applicable, and to track the orientation. External stationary cameras or other visual tracking systems may be used to achieve this. Thus, for example, it is possible to implement augmented reality applications, by which the position of the user carrying the carrier device is precisely defined in the room. This can, for example, simplify the user's task of accounting for objects or obstacles that exist in the room.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
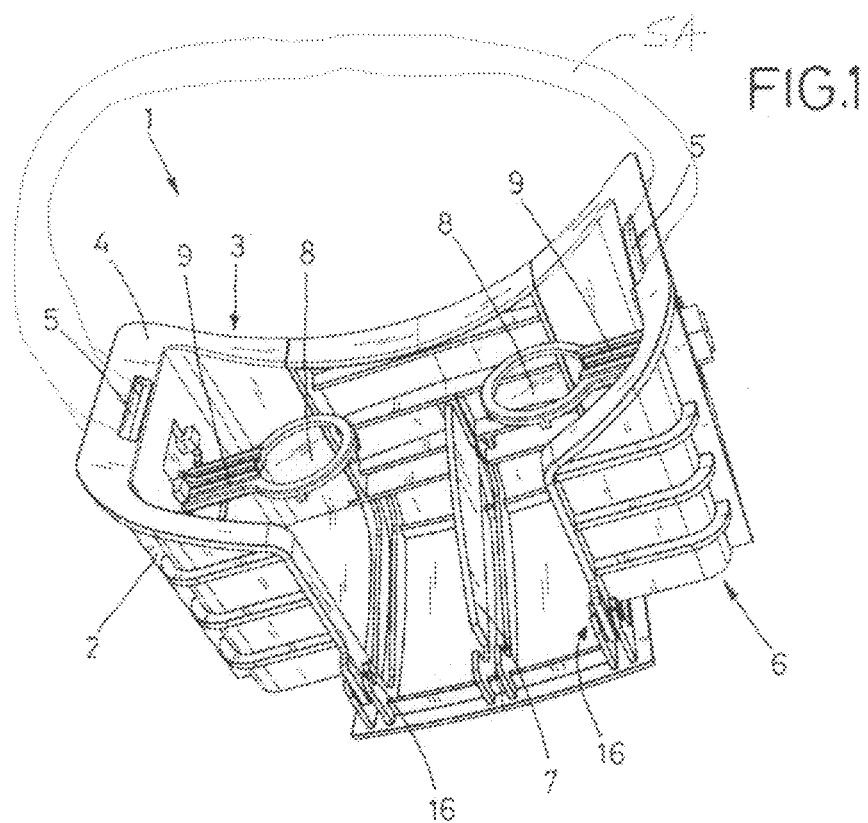
FIG. 1 is a first perspective bottom view of the carrier device according to the invention.
Figure 2:
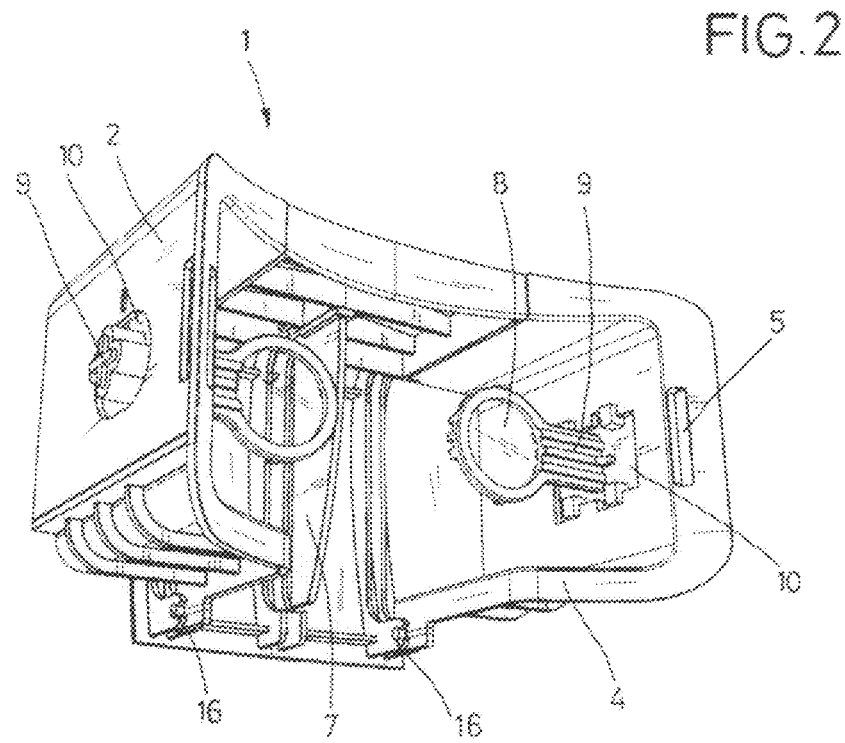
FIG. 2 is a second perspective bottom view of the carrier device of FIG. 1.

FIGS. 1-5 illustrate a carrier device 1 according to the invention. The carrier device 1 has a frame 2 constructed as a light tube or tunnel, whereby the frame 2 has essentially a C-shape in cross-section that is open at the bottom, as best seen in FIGS. 1 and 2.

The frame 2 has a front face 3 and rear face 6. The front face 3 has a concave curve with a surface 4 that is designed to fit against the forehead and face of the user. Padding, not shown in the figures, may be provided on the surface 4. A head mounting means 5 is provided on the front face 3. In the embodiment shown, the attachment means 5 includes two apertures that are provided on the front face 3 to which straps or a headband 5A may be attached, as a means to secure the carrier device 1 to the head of the user, to enable hands-free use of the electronic display unit. In the embodiment shown, the headband 5A is an elastic band that slips over the person's head. It is understood, that adjustable straps may be used instead of a stretchy headband.

Figure 4:
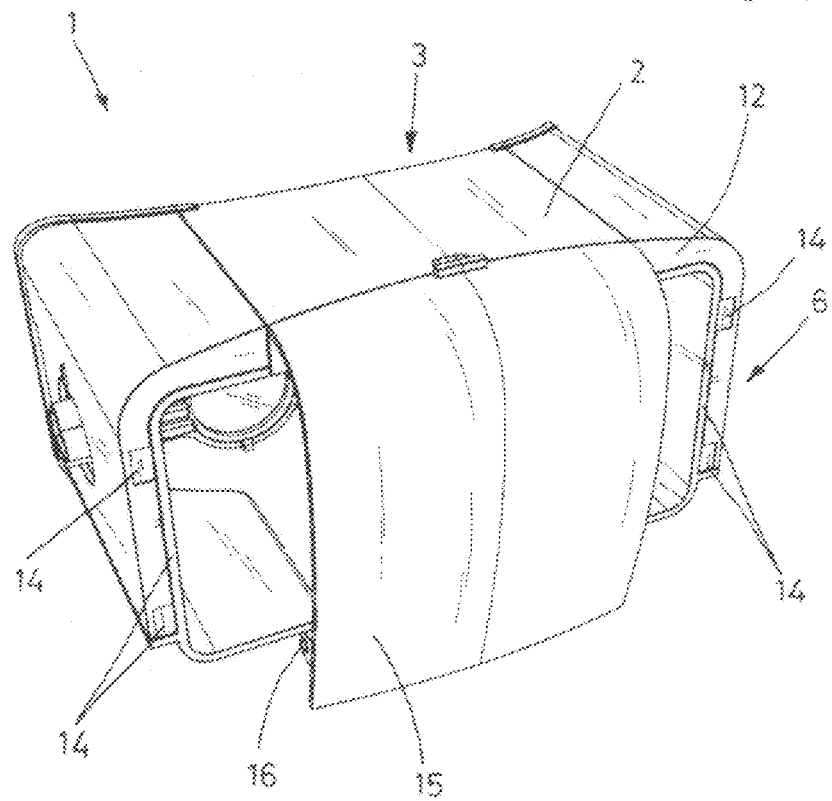
FIG. 4 is a perspective view of the carrier device, showing the top and the front face.
Figure 5:
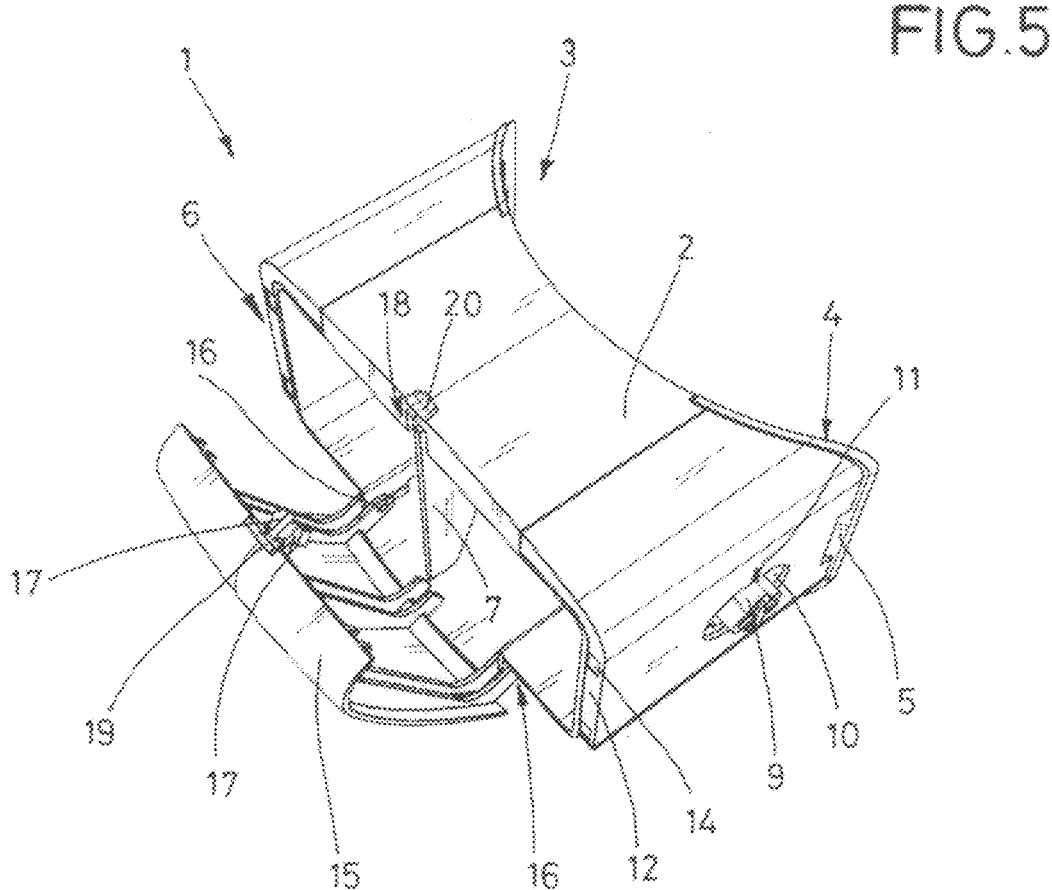
FIG. 5 is a perspective view of the carrier device, showing the top face with the safety latch opened.

The rear face 6, best seen in FIGS. 4 and 5, is the face of the carrier device 1 that is opposite the front face 3. This rear face 6 serves as a device mount that receives and holds the electronic display unit. Two images are displayed next to each other on the electronic display unit and, in order to enable a separate viewing of these two images with both eyes of the user, a divider wall 7 divides a front portion of the carrier device 1, so that each eye of the user sees only the image presented to that eye. The divider wall 7 is best seen in FIGS. 1, 2, and 5.

Figure 3:
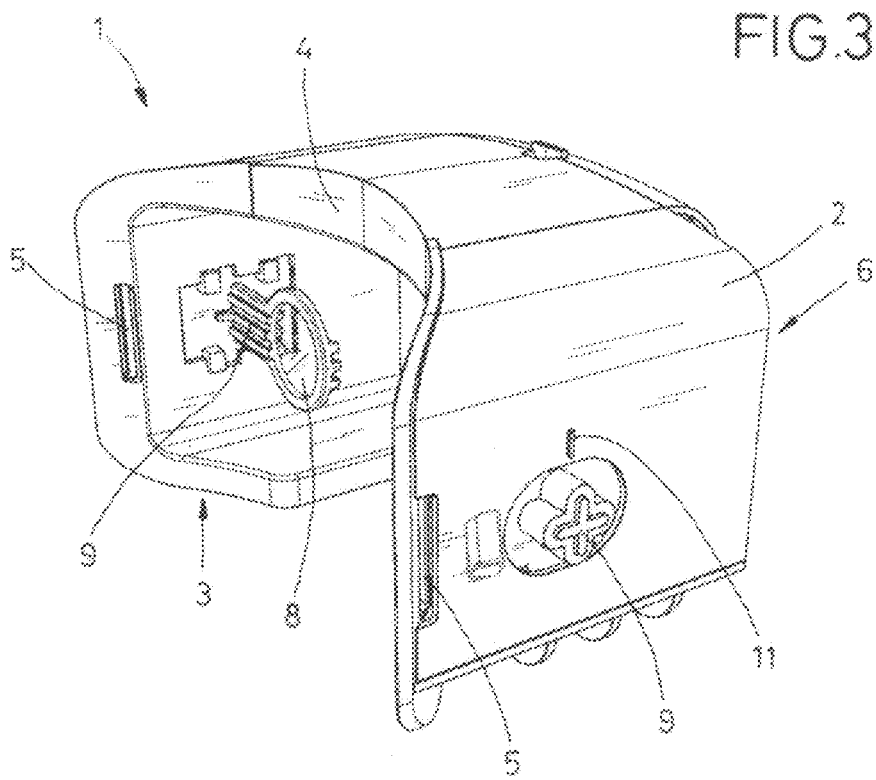
FIG. 3 is a perspective view of the carrier device, showing the rear face, the side and the top.

Two optical converging lenses 8 are mounted between the front face 3 and the rear face 6. In the embodiment shown, each converging lens 8 is mounted in a guide bracket 9 that extends from the converging lens to the frame 2 and beyond to the outside of the frame, as shown in FIGS. 2 and 3. The optical converging lenses 8 are shown adjusted to a position with the smallest distance to each other, adapted to a small distance between the eyes of the user. The two converging lenses 8 are adjustable away from each other, and independently of each other, to adjust to a greater distance between the eyes.

The guide bracket 9 is held in a slide 10, that is slidable in the length direction in the frame 2. A mark 11, shown in FIGS. 2 and 5 indicates that the slide 10 is in its middle or neutral position. The slide 10 may be moved relative to this neutral position, either toward the rear face 6 or toward the front face 3. This slide 10 allows the user to adjust the converging lens 8 along the optical axis, in order to adapt the distance of the converging lens 8 between the eye and to the display on the electronic display unit. A motor 8M may be provided, for adjusting the converging lenses 8.

Elastomeric pads 14 are provided on a device mounting or seating surface 12 on the rear face 6 of the frame 2. An electronic display unit, such as a mobile phone or a mobile player, may be fitted up against this surface 12, with the display facing toward the front face 3. The elastomeric pads 14 ensure a slip-free and scratch-free mount for the device. A safety latch 15 is provided on the frame 2, to securely hold the electronic display unit up in the carrier device 1. In the embodiment shown, the safety latch 15 is in the form of a bracket that is pivotably mounted at the bottom to the frame 2 by means one or more hinges 16. One or more spring-biased latches 17 in the form of snap pawls are provided on the upper edge of the safety latch 15, which cooperate with corresponding one or more catch elements 18 on the frame 2 to hold the safety latch 15 in a closed position.

The safety latch 15 is movable between a closed and an opened position, shown respectively in FIGS. 4 and 5. The electronic display unit may be placed against the seating surface 12 of the rear face 6 of the frame 2 when the safety latch 15 is open and is then be held securely against the frame 2 by swinging the safety latch 15 to its closed position. The safety latch 15 is secured to the frame 2 by pressing the snap pawls 17 until they catch with the corresponding catch elements 18. A grip 19 is provided on the safety latch 15 and a grip recess 20 provided on the frame 2 in the area near the latch 17/18. Pressing on the grip 19 sufficiently to overcome the force of the latch, releases the latches 17 from the catch elements 18, so that the safety latch 15 may then be swung away from the frame 2.

Figure 6:
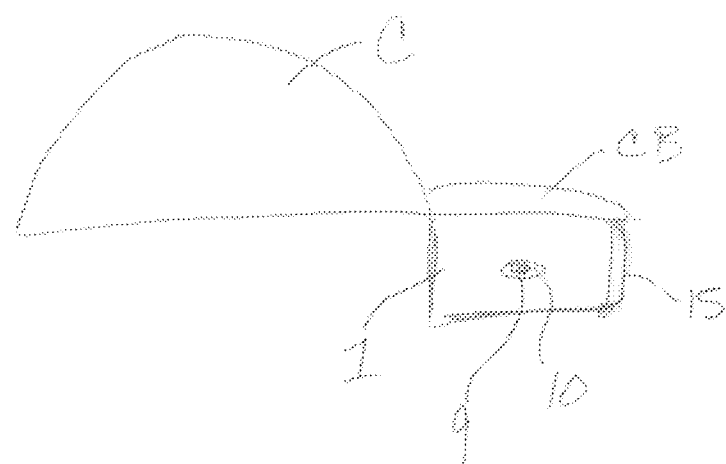
FIG. 6 illustrates a cap that serves as the head mounting means.

FIG. 6 illustrates a second head mounting means 5 that is provided as a cap C with a brim CB. Rather than attaching the carrier device 1 to the head of the user via a headband 5A, the carrier device 1 is suspended from the brim CB of the cap C.

It is understood that the embodiments described herein are merely illustrative of the present invention. Variations in the construction of the carrier device for an electronic display unit may be contemplated by one skilled in the art without limiting the intended scope of the invention herein disclosed and as defined by the following claims.

What is claimed is:

1. A carrier device for supporting an electronic display unit that is provided as a separate article, the carrier device to be worn on a head of a user, comprising:

a frame having a front face and a rear face, the front face formed to fit against a forehead of a user and the rear face adapted to releasably secure the electronic display unit in position for viewing by the user;

at least one optical converging lens mounted within the frame, between the first front face and the rear face; and a head mounting means incorporated into the frame, so that the frame is securable on the head of the user;

wherein the optical converging lens has an optical axis and is mounted so as to be adjustable in a direction along the optical axis, thereby enabling an adjustable distance of the converging lens to the head mount.

2. The carrier device of claim 1 wherein the optical converging lens includes a first converging lens and a second converging lens, each converging lens mounted such that a distance between the first and second converging lenses is adjustable in a direction transverse to the optical axis.

3. The carrier device of claim 2, further comprising at least one sensor that detects the distance between the first and second converging lenses.

4. The carrier device of claim 3, wherein the sensor is constructed as a pipe that includes two basic components, a pipe body and a piston movable relative to the pipe body for generating varying pitches.

5. The carrier device of claim 3, wherein one of the two basic components is connected to the first converging lens and the other basic component is connected to the second converging lens, such that the sensor generates varying pitches as a function of the distance of the first and second converging lenses to each other.

6. The carrier device of claim 4, wherein one of the two basic components is connected to one of the converging lenses and the other basic component connected to the frame of the carrier device, such that the sensor generates varying pitches as a function of a position of the one of the converging lenses to the frame.

7. The carrier device of claim 3, wherein the sensor includes a first sensor that detects a position of the first converging lens relative to the frame and a second sensor that detects a position of the second converging lens relative to the frame.

8. The carrier device of claim 7, wherein the position of the first converging lens and the position of the second converging lens are adjustable independently of each other.

9. The carrier device of claim 2, wherein the position of at least one of the first and second converging lenses is adjustable by a motor.

10. The carrier device of claim 1, wherein the frame is constructed as a converging light tunnel that extends from the front face through to the rear face, the light tunnel surrounded by a top face, a bottom and two side faces, and wherein light incidence is from the top face or one or both of the two side faces.

11. The carrier device of claim 10, further comprising a guide element that extends outside of the frame into the light tunnel and that is coupled to the at least one optical converging lens, wherein the user is able to adjust a position of the at least one converging lens from outside the light tunnel.

12. The carrier device of claim 1 further comprising a device safety latch that is pivotably coupled to the rear face of the frame and is releasably latchable to the frame, so as to secure the electronic display unit to the frame.

13. The carrier device of claim 12, wherein mounting surfaces for the electronic display unit are provided on the rear face of the frame.

14. The carrier device of claim 1, wherein the head mounting means is a cap that fits on the head of the user.

15. The carrier device of claim 14, wherein the cap has a brim and a device securement means that is attached to the brim.

16. The carrier device of claim 1, wherein the head mounting means is a headband.

* * * * *